(12) United States Patent
Katz et al.

(10) Patent No.: US 8,566,235 B2
(45) Date of Patent: *Oct. 22, 2013

(54) SYSTEM AND METHOD FOR PROVIDING DISPUTE RESOLUTION FOR ELECTRONIC PAYMENT TRANSACTIONS

(71) Applicant: Verifi, Inc., Los Angeles, CA (US)

(72) Inventors: Matthew G. Katz, Los Angeles, CA (US); Jeffrey Sawitke, Mentor, OH (US)

(73) Assignee: Verifi, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/624,834

(22) Filed: Sep. 21, 2012

(65) Prior Publication Data
US 2013/0080318 A1 Mar. 28, 2013

Related U.S. Application Data

(63) Continuation-in-part of application No. 13/104,907, filed on May 10, 2011, now Pat. No. 8,275,705, which is a continuation of application No. 12/343,195, filed on Dec. 23, 2008, now Pat. No. 7,941,352.

(51) Int. Cl.
G06Q 40/00 (2012.01)

(52) U.S. Cl.
USPC .......... 705/39; 705/40; 705/44; 705/30; 705/80; 235/379; 707/6

(58) Field of Classification Search
USPC .......... 705/39, 40, 44, 30, 80; 235/379; 707/6
See application file for complete search history.

(56) References Cited

U.S. PATENT DOCUMENTS

| 6,032,132 | A * | 2/2000 | Nelson | 705/34 |
| 2005/0125340 | A1* | 6/2005 | Lin et al. | 705/39 |
| 2006/0149671 | A1* | 7/2006 | Nix et al. | 705/40 |
| 2007/0061260 | A1* | 3/2007 | deGroeve et al. | 705/44 |
| 2008/0154783 | A1* | 6/2008 | Rule et al. | 705/80 |
| 2010/0312772 | A1* | 12/2010 | MacLean | 707/758 |

* cited by examiner

Primary Examiner — Vanel Frenel
(74) Attorney, Agent, or Firm — Novak Druce Connolly Bove + Quigg LLP

(57) ABSTRACT

Described herein is partner-based method and device for resolving inquiries or disputes concerning a transaction between the customer and a merchant that is affiliated with a partner platform. For example, the method may involve receiving, at the partner platform, an inquiry/dispute event notification. The method may involve obtaining data points about the transaction and locating the transaction based on the data points. The method may involve refunding the transaction or canceling future or recurring charges associated with the transaction.

22 Claims, 10 Drawing Sheets

SYSTEM AND METHOD FOR PROVIDING DISPUTE RESOLUTION FOR ELECTRONIC PAYMENT TRANSACTIONS

CROSS-REFERENCE TO RELATED APPLICATIONS

This application is a continuation-in-part of U.S. patent application Ser. No. 13/104,907, filed May 10, 2011, which is a continuation of U.S. patent application Ser. No. 12/343,195, filed Dec. 23, 2008, now U.S. Pat. No. 7,941,352, each of which are expressly incorporated by reference herein.

TECHNICAL FIELD

This invention generally relates to a method and system for providing dispute resolution for credit card or other electronic payment transactions, including but not limited to, debit card, ACH, eCheck, LEC transactions, etc. More specifically, the invention provides a method and system for allowing card issuers or other electronic payment providers to automatically remove cardholders or other purchasers from recurring payment programs and/or to issue credits to cardholders for disputed credit card transactions, if appropriate transaction parameters are satisfied, and to decline such credit requests when the transaction parameters are not satisfied.

BACKGROUND OF THE INVENTION

Credit cards and other payment instruments, such as debit cards and check cards, are widely used by holders to purchase goods and services in the marketplace. It is projected that at least 35% of all U.S. cardholder payments in 2007 will be made via "plastic" (i.e., a credit or debit card), and it is estimated that this rate will increase to at least 49% by 2010. The current annual value of these transactions exceeds 400 billion dollars. While credit card transactions are convenient for cardholders, they present a special set of problems for merchants and credit card issuers. One such problem occurs when a cardholder disputes a credit card transaction, necessitating the expenditure of substantial time and resources in investigating and resolving such disputes.

Cardholders and other purchasers using an electronic payment provider are increasingly going directly to their card issuer to resolve billing disputes rather than contacting the merchant directly. This trend toward chargebacks that are initiated without any prior contact with the merchant by the cardholder results in inefficient resolution of such disputes because when the merchant is not directly involved in the resolution process, the card issuer must undertake the resolution activities on behalf of the merchant, thus increasing the complexity, time and expense of the resolution process.

To understand the problem presented by credit card and other electronic payment provider transaction disputes, a brief overview of the electronic payment provider process is required. Credit cards are provided to a cardholder by an issuing bank. When a cardholder enters into a transaction with a merchant using the credit card, the issuing bank commits to pay the merchant at the time the transaction is verified.

Each month, the credit card user is sent a statement documenting the purchases made with the card, and the total balance owed. According to the Fair Credit Billing Act, the cardholder can dispute any charges on the statement that he or she thinks are incorrect. The cardholder mayor may not have contacted the merchant about remedying the situation before contacting the issuing bank.

The chargeback process varies somewhat from credit card company to credit card company, but generally follows the sequence shown in FIG. 1. At step 1, a credit card holder disputes a transaction with their issuing bank. At step 2, the issuing bank investigates to determine whether the chargeback request is valid, and if it is not, denies the chargeback. At step 3, a provisional credit representing the amount charged is placed back in the user's account. At step 4, the issuing bank initiates a chargeback process and obtains credit representing the chargeback purchase from the merchant's bank. At step 5, the merchant's bank investigates the chargeback request to determine if it is valid, and, if not, the chargeback is returned to the issuing bank. If the merchant's bank determines the chargeback is valid, at step 6, the chargeback amount is removed from the merchant's bank account, and the merchant's bank provides written notice to the merchant. At step 7, the merchant is given an opportunity to refute the chargeback, and, if its documentation is satisfactory, the chargeback is declined and the cardholder is once again charged for the sale. If the chargeback is not declined, the chargeback is successful and the process is completed.

SUMMARY

The present invention provides a card issuer or other electronic payment provider with a system and method for obtaining a quick, favorable and efficient resolution to the customers' disputes with merchants, thus reducing operating expenses, while providing superior customer service. The present invention may also be used simultaneously with one or more of various types of electronic payments offered by card issuers or other electronic payment providers, such as credit card, debit card, ACH, eCheck, mobile payments, LEC, etc., transactions, and with one or more payment brands or networks within each type of electronic payment transactions, such as within credit card electronic payment transactions, providing simultaneous use with Visa, MC, Amex, Discover and JCB card transactions. The present invention thus provides multiple connectivity to a plurality of various types of electronic payment networks, such as credit card, debit card, ACH, eCheck, mobile payments, LEC, etc., and with one or more payment brands or networks within each type of electronic payment transactions.

The present invention allows issuers to obtain a quick turnaround in cardholder credit processing with minimal resource expenditure. For recurring payment program merchants, cardholders are removed from the recurring payment program, which prevents submission of future authorization requests, thus eliminating the potential for future disputes. The present invention thereby significantly reduces the time and cost required for the card issuer to resolve cardholder transaction disputes, while delivering a favorable resolution to the cardholder.

In one preferred embodiment, shown in FIGS. 2 and 3, the system and method of the present invention are illustrated. The payment instrument holder initiates a notice of dispute to the card issuer and submits the necessary transaction information by internet, mail, fax, email, in-person, via SMS mobile text, mobile phone or by telephone, through the touchtone keypad of the phone, or by responding orally wherein the system utilizes voice recognition software (IVR) to convert voice data into computer readable data.

The card issuer or device associated with the card issuer terminal, such as a scanner or IVR system, inputs the transaction information into the card issuer terminal for processing by the card issuer processing system.

The card issuer processing system sends a queue of eligible transactions to the dispute resolution system server for processing. This request includes the transaction data that is required for adjudication of the dispute regarding the transaction, such as credit card number, transaction amount, transaction date and merchant identification. The dispute resolution system determines if the transaction qualifies for resolution under the system and, if so, directs the issuance of the credit to the cardholder for the transaction, cancels the transaction, and sends reports of the results of the dispute resolution to the card issuer and the originating merchant. The present invention may be used with multiple card types, card issuers, merchants and payment types, such as ACH, mobile payments, LEC billing, etc.

In further related aspects, described herein is a merchant or partner-based method and device for resolving inquiries or disputes between a customer and an electronic payment provider concerning a transaction between the customer and a merchant that is affiliated with a partner/aggregator platform. In one approach, the method may involve receiving, at the partner entity/platform, an inquiry/dispute event notification. The method may involve obtaining data points about the transaction and locating the transaction based on the data points. The method may involve refunding the transaction, cancelling the transaction, and/or blocking future/recurring charges. In related aspects, an electronic device (e.g., a partner/aggregator server or component(s) thereof) may be configured to execute the above-described methodology.

DETAILED DESCRIPTION OF THE PREFERRED EMBODIMENTS

Figure 1:
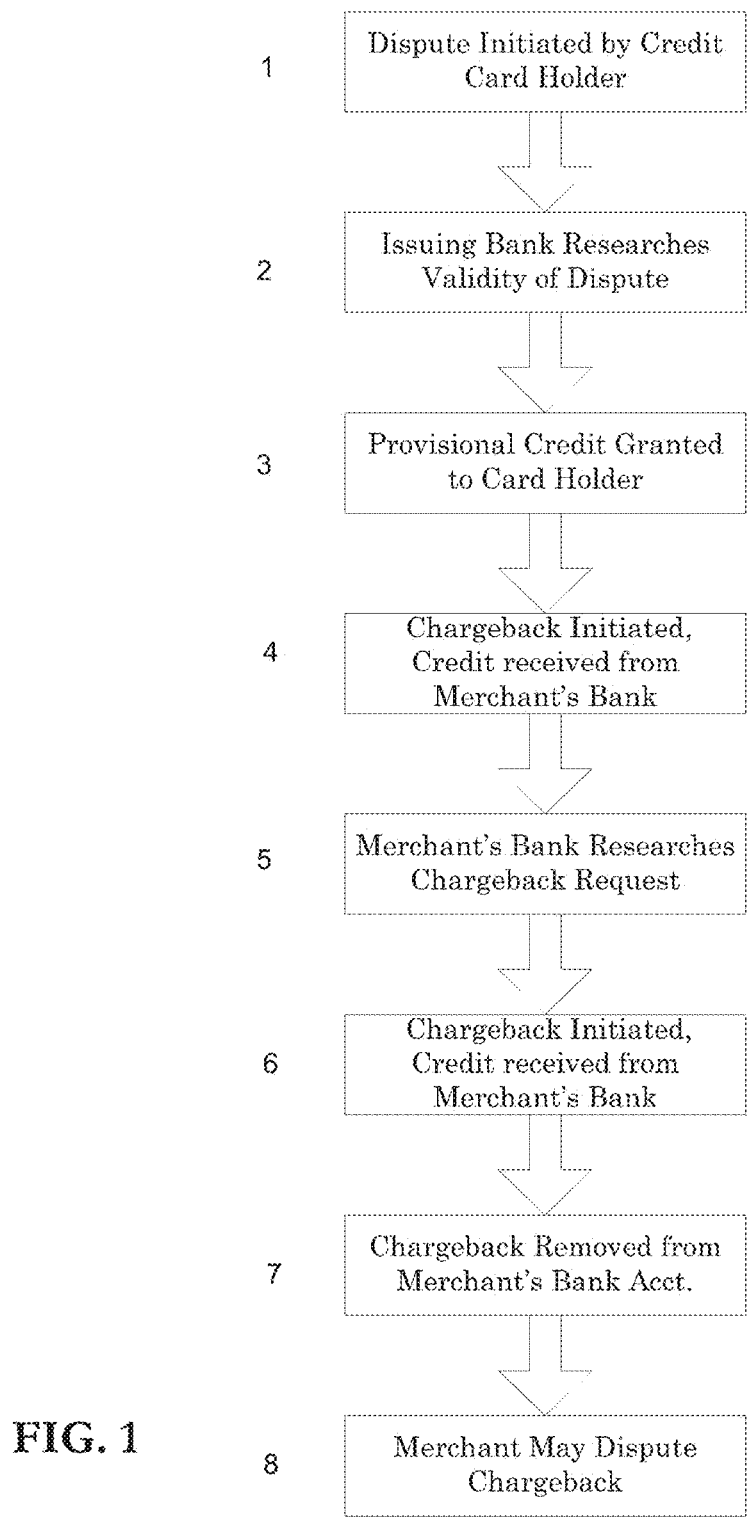
FIG. 1 is a simplified diagram illustrating the chargeback process.

Reference is now made to the figures in which like reference numerals refer to like elements. In the following description, certain specific details of programming, software modules, user selections, network transactions, database queries, database structures, etc., are provided for a thorough understanding of the embodiments of the invention. However, those skilled in the art will recognize that the invention can be practiced without one or more of the specific details, or with other methods, components, materials, etc. In some cases, well-known structures, materials, or operations are not shown or described in detail in order to avoid obscuring aspects of the invention. Furthermore, the described features, structures, or characteristics may be combined in any suitable manner in one or more embodiments.

Figure 2:
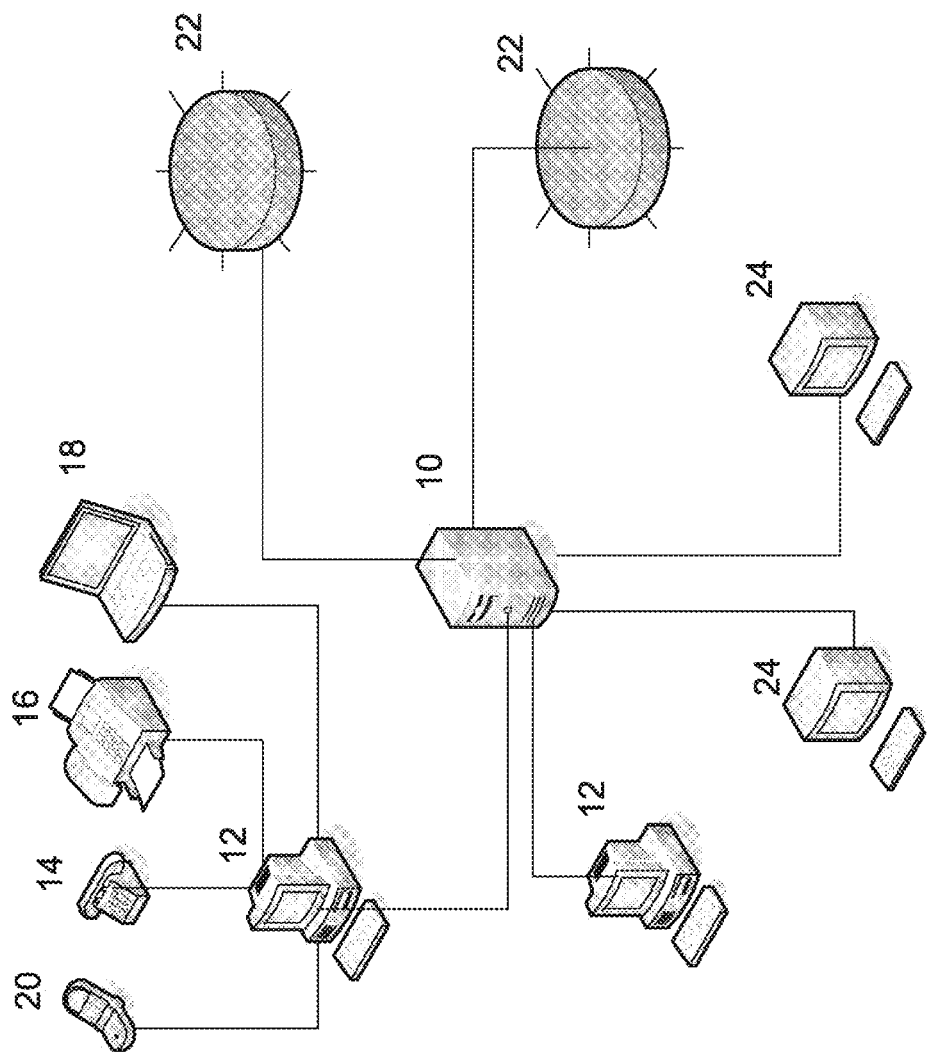
FIG. 2 is a simplified diagram illustrating the system components of a preferred embodiment of the present invention.
Figure 3:
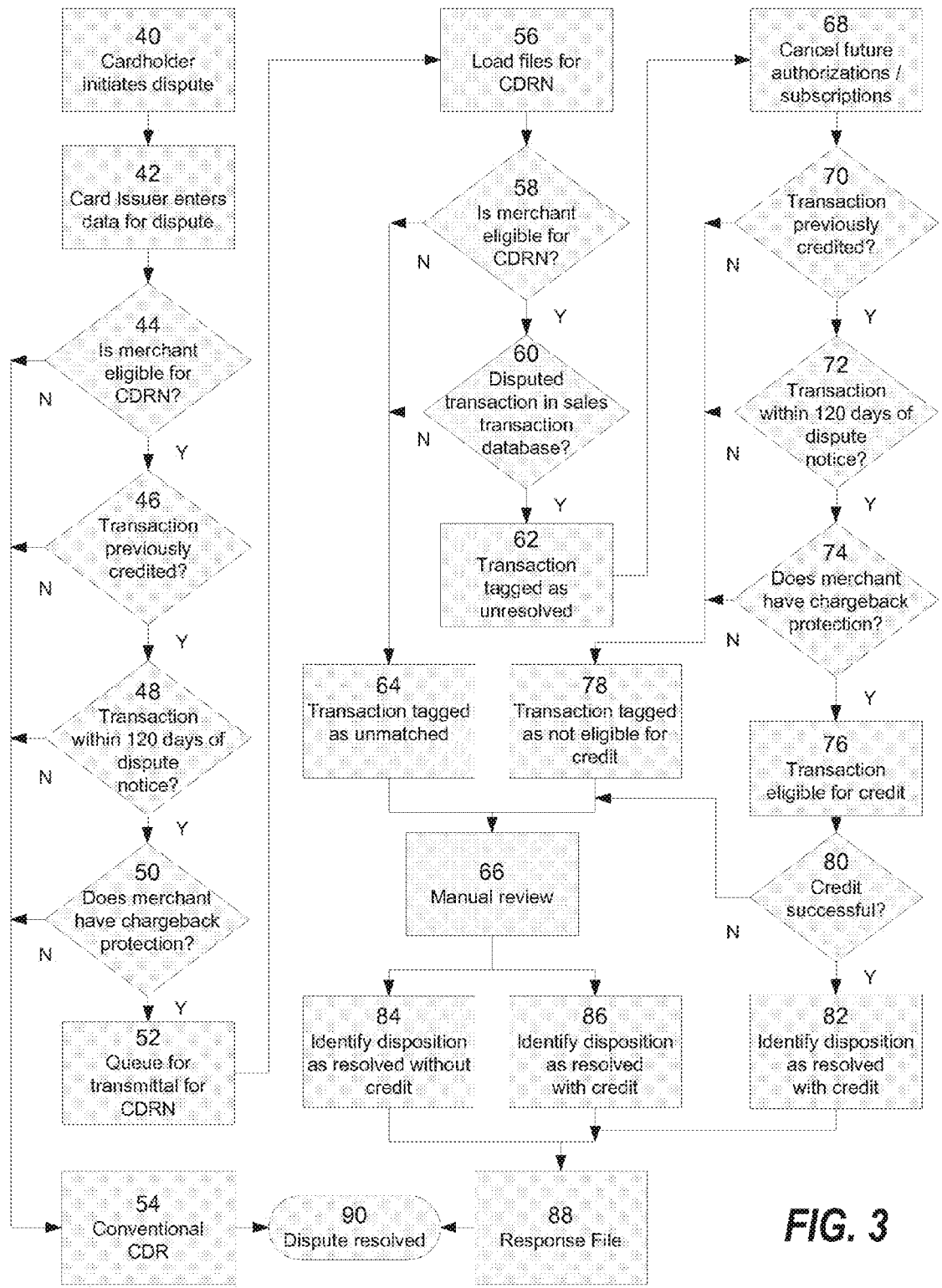
FIG. 3 is a flow diagram which illustrates certain methodologies in accordance with the present invention.

In one preferred embodiment, shown in FIGS. 2 and 3, the system and method of the present invention are illustrated. As shown in FIG. 2, the system of the present invention preferably includes a dispute resolution server 10, which is linked to a card issuer's computer processing system 12 by an application programming interface on the card issuer's computer system. The interface obtains transaction details necessary to implement the dispute resolution process, including credit card number, credit card expiration date, cardholder name and address, transaction amount and merchant identification, such as merchant name, phone number, URL, or merchant acquirer bank identification.

The interface is connected to the dispute resolution server 10 by a data transmission link, such as the Internet, or other electronic file transfer protocols such as FTP, SFTP, FTPS, HTTP, HTTPS, TELNET, SSH, XML, REST, or JSON as examples.

The interface preferably is connected to the dispute resolution server 10 by data transmission link, such as the Internet, telephone line or network cable. The interface may transfer transaction data to the server in batch files or by single transaction record using electronic file transfer protocols such as FTP, SFTP, FTPS, HTTP, HTTPS, TELNET, SSH, XML, REST, or JSON as examples. Either "nighttime" batch file transfer or real time transfer by application programming interface (API) may be used for these files.

Alternatively, the system of the present invention may be operated on the card issuer's computer 12 which is connected via the Internet or other communication network to the dispute resolution program server 10. In the alternative, or in addition, the techniques described herein may be operated on one or more entities in the system, such as, for example, a merchant entity (e.g., merchant's processing device 24 in FIG. 2 or merchant platform 120 in FIG. 4), a partner entity (e.g., partner platform 130 in FIG. 4), or the like, or combinations thereof.

As shown in FIG. 2, the cardholder initiating the dispute may submit the relevant information to the card issuer by telephone 14, fax 16, or by mail, SMS, online or other electronic medium using a computer 18 or mobile device 20, such as cellular telephone, standard landline, PDA, or pager. The cardholder may alternatively submit the dispute information via in-person communication or the like.

The card issuer and/or the cardholder may be equipped with or otherwise be in communication with a processing device 12, such as a PC or laptop, which may be programmed to receive and process data related to disputed transactions. The dispute data may be input into appropriate electronic format manually by the card issuer's employee using an input device, such as a keyboard or mouse, or it may be converted directly from the cardholder's input by IVR in the case of a telephone notice, by OCR in the case of a mail or fax notice, or directly from electronic input in the case of on-line submissions.

For example, the card issuer processing device 12 may transmit a batch file containing one or more dispute items to the dispute resolution system server 10 via one of the previously described data transmission links and electronic file transfer protocols. In related aspects, API and BATCH based communication methods between the issuer device 12 and the dispute resolution server 10 may be supported. The dispute resolution system may process the requests and return a response back to the card issuer processing device 12 via the same link.

The dispute resolution system may also generate a response concerning the disputed transaction to the originating merchant's processing device 24 via previously described data transmission links and electronic file transfer protocols. For example, the dispute resolution system server 10 may also serve as the payment processing system for the merchant. Thus, in the capacity of payment processing system for the merchant, the dispute resolution system server 10 receives transactions from the merchant, forwards received transactions to acquirers 22, and stores transaction data. As is known in the art, acquirer 22 is a merchant's acquiring bank which is a banking or financial institution which provides the merchant with a merchant processing account for the processing of electronic transactions originating from the merchant's customers. The acquirer 22 sends transaction information to the payment networks, such as Visa, MC, Amex, Discover and JCB which connect the Issuer and the Acquirer, and provide a clearing and settlement service to transfer payment information between the Issuer and the Acquirer. Because the dispute resolution system server 10 also serves as the payment processing system for the merchant, the present example offers the advantage of immediately declining future transactions from the merchant for the disputing consumer, including terminating ongoing recurring transactions. This prevents the recurrence of such disputed transactions while the dispute relating to the current disputed transaction is resolved. In another example, the dispute resolution server 10 may not serve as the payment processing system for the merchant. In yet another example, the dispute resolution service or technique may be implemented via a network entity other than a dispute resolution server 10 (e.g., partner platform 130 and/or merchant platform 120 in FIG. 4), wherein the network entity does not serve as the payment processing system for the merchant. For example, the network entity may be a partner platform or the like that communicates with the merchant (e.g., merchant 24 in FIG. 2 or merchant platform 120 in FIG. 4), wherein the merchant handles the payment process directly with the acquirer/payment network to perform the dispute resolution. The merchant may provide the network entity with the data/results related to the processing performed to resolve the dispute or inquiry.

As shown in FIG. 3, the process begins at step 40 with the cardholder initiating the dispute by providing notice of the dispute to the card issuer. The cardholder may submit the dispute to the issuer by telephone, mail, fax, e-mail or online On-line submissions may be facilitated by the card issuer in the provision of a link in an on-line statement provided to the cardholder of a pop-up-form. This link may connect the cardholder to the card issuer's processing system, or alternatively directly to the merchant with whom the transaction was initiated. This latter alternative allows the cardholder to mediate the dispute directly with the merchant.

Once the chargeback dispute template is completed by the cardholder, they can select the submit button and the system will use the template to generate a standard charge dispute form, which includes all the necessary information to dispute a charge.

This information may be submitted by the cardholder with the following statement:

I have examined the charges made to my account and I am disputing an item for the following reason:
1. Neither I nor any person authorized by me to use my card made the charge listed above. In addition, neither I nor anyone authorized by me received the goods and services represented by this transaction. (If you do not recognize a sale, choose this option and call Customer Service immediately.)
2. Although I did participate in a transaction with the merchant. I was billed for transaction(s) totaling $ that I did not engage in, nor did anyone else authorized to use my card. I do have all of my cards in my possession. Enclosed is a copy of the authorized sales slip.
3. I have not received the merchandise that was to have been shipped to me. Expected date of delivery was (mm-dd-yy). I contacted the merchant on (mm-dd-yy), and the merchant's response was: (In order to assist you, the merchant must be contacted.)

Of course, as is recognized in the art, there may exist many other bases for an asserted dispute, as exemplified in the listing of Dispute Reason Codes discussed later.

At step 42, the card issuer inputs the data relating to the notice of dispute received from the card issuer. The dispute data includes such information regarding the transaction, such as:

---
Name:
Date: (mm-dd-yy)
Account #: - - -
Amount of Dispute: $
Reference #:
Merchant:
Reason for dispute:
---

At step 44, upon receipt of the dispute notification, the Issuer processor 10 determines whether the dispute or inquiry is eligible for processing by the Dispute Resolution System by matching or comparing the disputed transaction details extracted by the Issuer from interchange data against a table of identifiers for participating merchants provided by the Dispute Resolution System. The table may be periodically updated by a data transmission, preferably by secure batch file transmission such as FTPS (FTP over SSL), although other types of file transmission may be used, such as e-mail of Excel spreadsheet files or physical transfer of electronic storage media, including DVD or CD/ROM. In another example, an online portal or the like may be used by the issuer(s) 12 to check whether the dispute or inquiry is eligible for processing by the dispute resolution system. The issuer may key in the merchant descriptor, phone number, or the like to determine if the dispute/inquiry case is eligible for processing or participation in the dispute resolution system or network.

Preferably, at steps 46,48 and 50, the card issuer system also screens disputes for ineligible transactions based on the predetermined transaction-level eligibility requirements such as whether the transaction was previously refunded or refunded by the merchant and/or the dispute resolution system provider at step 46, whether the transaction has a Central Processing Date (CPO) greater than a predetermined interval, such as 120 days from the date of the dispute resolution system dispute request, at step 48, and whether the transaction originated with a merchant who receives chargeback protection, as chargeback rights do not exist for the card Issuer against the merchant in such case in step 50. As may be appreciated by one skilled in the art, the eligibility criteria which are tested at steps 46, 48 and 50 may vary for different card issuers, depending upon their specific preferences. For example, eligibility criteria may also be determined according to the identity of the originating merchant, depending upon the Card Issuer's preference. Further, whether the transaction has a Central Processing Date (CPO) greater than a predetermined maximum interval, such as 120 days from the date of the dispute resolution system dispute request, may also be used to determine eligibility. As may be understood by persons of ordinary skill in the art, the 120 day maximum interval from the date of the transaction to the date of the dispute resolution system dispute request is offered only as an example, and this interval may be adjusted as desired by the Card Issuer.

At step 52 disputes which return a match when referencing the merchant eligibility table (and/or manual eligibility verification), and which do not violate the transaction-level criteria are flagged as Dispute Resolution System eligible and sorted into a separate queue within the Issuer's system prior to processing by the Dispute Resolution System. The Dispute Resolution System request file may be generated and supplied by the Issuer as specified below and transmitted via internet for Dispute Resolution System processing. In another example, the Issuer may transmit the case to the Dispute Resolution System via an API transmission or the like.

| Field Name | Description |
| --- | --- |
| Issuer ID | Predefined Issuer identification value provided by system to identify the Issuer submitting the dispute request file |
| Transaction Description | Merchant DBA/payment billing descriptor |
| Billing Descriptor Phone | Billing descriptor merchant phone number parsed from Transaction Description or City Name field |
| Acquiring Institution Identification Code | |
| Card Acceptor Identification Code | |
| Card Acceptor Terminal Identification | |
| Card Acceptor Name/Location - Merchant Name | |
| Card Acceptor Name/Location - City Name | |
| Card Acceptor Name/Location - Country Code | |
| Merchant Type/MCC | |
| POS Entry Mode | |
| POS Condition Mode | |
| First Name | Cardholder first name |
| Last Name | Cardholder last name |
| Billing Street Address 1 | Cardholder billing street address 1 |
| Billing Street Address 2 | Cardholder billing street address 2 |
| Billing City | Cardholder billing city |
| Billing State | Cardholder billing state |
| Billing Zip | Cardholder billing zip |
| Payment Type | "visa", "mastercard", "amex", "discover", "jcb", or "diners" |
| Account Number | Full or Hashed CC Number. If hashed, minimum first 6, last 4 digits; example 412345xxxxxx1234 |
| Expiration Date | Cardholder expiration date formatted as "MMYY" |
| Authorization Code | Authorization code from original transaction |
| Central Processing Date (CPD) | Original sale transaction date formatted as "MM/DD/YYYY" |
| Transaction Amount | Original sale transaction ticket amount |
| ARN | 23 digit acquirer reference number |
| Transaction Type | Transaction Type Identifier (reference Transaction Type matrix) |
| Dispute Date | Date cardholder contacted issuing bank formatted as "MM/DD/YYYY" |
| Dispute Amount | Amount of inquiry or chargeback (in the event of a partial dispute, this amount may potentially be less than the transaction amount of this file) |
| Reason Code | Reason code of the dispute classification (reference Dispute Reason Code table) |
| Case Number | Unique case identifier generated by the Issuer E.g.: "20080710-1" |

The following chart of Data Type Codes apply to the above table.

| Code | Name | Description |
| --- | --- | --- |
| A | Alpha | Only alpha data is allowed. |
| N | Numeric | Only numeric data is allowed. |
| AN | Alpha-Numeric | Alpha and Numeric data is allowed. |

The request file contains a Dispute Reason Code which specifies the basis for the transaction dispute. The following exemplar predefined Dispute Reason Codes have been recognized by two major card networks:

| Visa Code | MC Code | Description |
| --- | --- | --- |
| | | Cardholder Asserted Disputes |
| 30 | 55 | Services Not Provided or Merchandise Not Received |
| 85 | 60 | Credit Not Processed |
| 41 | 41 | Cancelled Recurring Transaction |
| 53 | 53 | Not As Described or Defective Merchandise |
| 75 | 63 | Cardholder Does Not Recognize Transaction |
| 82 | 34 | Duplicate Processing |
| 86 | 59 | Paid By Other Means |
| N/A | 54 | Cardholder Dispute - Not Elsewhere Classified |
| 57 | N/A | Fraudulent Multiple Transactions |
| 83 | 37 | Fraudulent Transaction - Card Absent Environment |
| | | Non-Cardholder Asserted Disputes |
| 80 | 31 | Incorrect Transaction Amount or Account Number |
| 76 | 50 | Incorrect Currency or Transaction Code or Domestic Processing Violation |
| 77 | 12 | Non-Matching Account Number |
| 79 | N/A | Requested Transaction Information Not Received |
| 60 | 02 | Requested Copy Illegible or Invalid |
| 71 | N/A | Declined Authorization |
| 72 | N/A | No Authorization |
| 73 | 35 | Expired Card |

-continued

| Visa Code | MC Code | Description |
|---|---|---|
| 74 | 42 | Late Presentment |
| 76 | 46 | Incorrect Currency or Transaction Code or Domestic Processing Violation |
| N/A | 01 | Non-Receipt of Requested Item |
| N/A | 08 | Requested/required Authorization Not Obtained |
| N/A | 57 | Credit Card Activated Telephone Transaction |
| 00 | 00 | Other/Unspecified (Default if no reason code is passed) |

Alternatively, at step 54, those disputes which return "no match" with the qualifying merchant identification descriptors in the table or which violate the transaction-level criteria are flagged to be processed via the Issuer's conventional dispute resolution procedures.

Once a predetermined number of eligible dispute records, or on a predetermined interval, the card issuer system may transmit a batch file containing one or more dispute items to a file transfer system, such as FTPS. In another example, the card issuer system may transmit the dispute item(s) via API or the like. At step 56, the dispute resolution system will then pick up the file, remove the file from the FTPS system and load the file into the dispute resolution system. In another example, the dispute resolution system may return a response back to the Issuer via an API or the like. In the subsequent steps, the dispute resolution system will process the file and return a response back to a location on the FTPS system.

At step 58, the dispute resolution system processor 10 confirms whether the dispute is eligible for processing by the Dispute Resolution System transactions by matching the merchant identification descriptor from the disputed transaction against the table of identifiers for participating merchants.

At step 60, the dispute resolution system processor 10 determines whether the transaction is eligible for the dispute resolution system processing. For example, this eligibility may be determined by attempting to match the dispute request transaction details against the records in the sales transaction database. In another example, eligibility may be determined by sending the dispute data to partner (e.g., partner platform 130) to perform such checks with a database or the like, wherein data regarding the sale transactions are not stored within the Dispute Resolution System. This sales transaction database represents transactions initiated with the participating merchants, so that, if appropriate, a refund may be issued to the cardholder from the merchant. As illustrated at step 60 in FIG. 3, the sales transaction database may be populated with data relating to transactions from participating merchants, which transactions were originally processed through the dispute resolution system processor 10. In one example, only those transactions which were processed through the dispute resolution system processor 10 transaction gateway are eligible for the dispute resolution system processing and are selected in step 60. Optionally, the sales transaction database can be populated with bulk file transfers of data representing transactions initiated with the participating merchants. This data may be provided by the merchants themselves, or from acquirers, card associations, or other entities. Thus, by attempting to match the dispute request transaction details against the eligible sales transaction database, eligibility for dispute resolution system processing can be determined so that only those transactions for which there is the ability to issue a refund to the cardholder from the merchant are processed in the Dispute Resolution System.

At step 62 dispute requests for transactions which return a match when referencing the merchant eligibility table, and which match against the records in the sales transaction database as originally processed through the dispute resolution system, are tagged as "Unresolved" and queued for further processing by the Dispute Resolution System. The dispute requests are identified according to the following table:

| Issuer Response Codes | |
|---|---|
| Code | Description |
| *Approval for Credit* | |
| 100 | Resolved w/ Credit: Cancellation & credit processed |
| 101 | Resolved w/ Partial Credit: Cancellation & partial credit processed |
| *Unmatched Request* | |
| 900 | Unmatched - General |
| 901 | Unmatched - Invalid Merchant, Non-dispute resolution participating Merchant |
| 902 | Unmatched - Original sale transaction not processed via service provider; Unable to honor request |
| *Credit Decline* | |
| *Ineligible Dispute Resolution Credit Request, Recurring Payment Authorization Cancellation Only* | |
| 940 | Decline - Duplicate dispute resolution credit request |
| 950 | Decline - General |
| 951 | Decline - Transaction previously credited, credit transaction details provided |
| 952 | Decline - Transaction previously charged back, chargeback details provided |
| 953 | Decline - Request is greater than 120 days from CPD of transaction |
| 954 | Decline - Successfully authenticated transaction (Verified by Visa/SecureCode) |

One of the bases for declining the credit request identified in the table is that the transaction has a Central Processing Date (CPO) greater than 120 days from the date of the dispute resolution system dispute request. As described above, the 120 day maximum interval from the transaction to the date of the dispute resolution system dispute request is only offered as an example, and this interval may be adjusted as desired by the Card Issuer.

Alternatively, at step 64, those disputes which return "no match" with the qualifying merchant identification descriptors in the table or which were not originally processed through the dispute resolution system are tagged as "unmatched" and at step 66 are forwarded for manual review to determine the reason for the failed credit transaction (invalid account number, account closed, previously charged back, etc.).

At step 68, the card accounts that are subject to the credit determination are flagged for cancellation of future authorizations and subscriptions so that future authorizations from the merchant for the disputing cardholder are blocked at the gateway level and the cardholder's subscription is cancelled. This prevents further use of the card for goods or services provided by the selling merchant until the dispute has been satisfactorily resolved.

At steps 70, 72, and 74, the dispute resolution processor device 10 and/or the card issuer system 12 may confirm that the transaction is eligible for dispute resolution system based on the predetermined transaction-level eligibility requirements, such as whether the transaction was previously refunded or refunded by the merchant and/or the dispute resolution system provider at step 70, whether the transaction has a Central Processing Date (CPO) greater than 120 days from the date of the dispute resolution system dispute request at step 72, and whether the transaction originated with a merchant who receives chargeback protection, as chargeback rights do not exist for the card Issuer against the merchant in such case in step 74. In one example, in order to apply such eligibility checks, the request received by the Dispute Resolution System 12 may be matched, which itself serves as an eligibility check.

At step 76, eligible credit transactions may be processed through credit card payment gateways 22 such that if the dispute is determined to be valid, the original sales transaction is rescinded and the cardholder's account is credited in the amount of the disputed purchase. In another example, such processing may be initiated by the dispute resolution processor device 10 or by a partner (e.g., partner platform 130 in FIG. 4).

Alternatively, at step 78, those disputes which are determined to be ineligible for dispute resolution system based on the predetermined transaction-level eligibility requirements are flagged to undergo a manual review at step 66, to determine the reason for the failure to meet eligibility requirements (e.g., invalid account number, account closed, previously charged back, unable to be matched by the Dispute Resolution System 12 or the like, etc.).

At step 80, a determination as to whether the original sales transaction is credited by a response from the interchange system that the credit was processed, and at step 82, successful credit disputes result in the Dispute Resolution System request status being updated to "Resolved w/ Credit."

At step 78, unsuccessful credit disputes are identified to undergo a manual review at step 66, to determine the reason for the failed credit transaction (invalid account number, account closed, previously charged back, etc.).

At step 84, the Dispute Resolution System record status for the transaction is updated to "Resolved w/Out Credit" and the description for the credit request failure is included in response file.

Alternatively, at step 86, for successful credit transactions, the status in the Dispute Resolution System record is updated to "Resolved with Credit."

At step 88, for both the successful credit transactions and unsuccessful credits transactions, the response file containing updated information for all Dispute Resolution System request records is compiled and transmitted to the card issuer and the merchant with the appropriate disposition for each transaction-"Resolved w/credit", "Resolved w/o credit," "Unmatched," etc. The response file may be made available to the card issuer and the merchant by an on-demand web portal for downloading at the convenience of the card issuer and the merchant.

The Dispute Resolution System response file is transmitted to the Issuer as specified below upon processing the transaction level matching against the Dispute Resolution System request file.

| Field Name | Description |
| --- | --- |
| Case Number | Returned from request |
| ARN | Returned from request |
| Billing Descriptor | Merchant billing descriptor that credit posted as |
| Billing Descriptor Phone Number | Billing descriptor merchant phone number that credit posted as |
| Date | Date of action |
| Amount | Amount of action |
| Transaction | Transaction Type Identifier: Always set as "Dispute Resolution System" |
| Response | Please reference Dispute Resolution System Issuer response matrix |
| Description | Dispute Resolution System response description from the Dispute Resolution System Issuer Response Matrix |

The Response code in the above table of the Dispute Resolution System Issuer Response File corresponds to the values in the following table.

| Code | Description |
| --- | --- |
| | Approval |
| 100 | Resolved w/ Credit: Cancellation & credit processed |
| 101 | Resolved w/ Partial Credit: Cancellation & partial credit processed |
| | Unmatched Request |
| 900 | Unmatched - General |
| 901 | Unmatched - Invalid Merchant, Non-dispute resolution participating Merchant |
| 902 | Unmatched - Original sale transaction not processed via service provider; Unable to honor request |
| | Decline |
| 940 | Decline - Duplicate dispute resolution credit request |
| 950 | Decline - General |
| 951 | Decline - Transaction previously credited, credit transaction details provided |
| 952 | Decline - Transaction previously charged back, chargeback details provided |
| 953 | Decline - Request is greater than 120 days from CPD of transaction |
| 954 | Decline - Successfully authenticated transaction (Verified by Visa/SecureCode) |

Also, at step 88, a merchant response file, including a cancellation record created to remove the disputing customer from recurring payment program, is routed to the merchant. The Cancellation Export Batch File is provided as indicated below.

| Field Name | Description |
| --- | --- |
| Transaction Date | Timestamp of Transaction Format: YYYYMMDDHHMMSS |
| Transaction ID | System Transaction ID |
| Original Transaction ID | System Transaction ID referencing the original transaction. |
| Payment Type | Payment Identifier |
| | Visa |
| | MasterCard |
| | American Express |
| | Discover |
| Transaction Type | Transaction Type Identifier Cancellations |
| Transaction Status | Status of Transaction |
| Account Number | Account Number |
| Expiration Date | Expiration Date |
| | MMYY Format |
| Amount | USD Total Transaction Amount of the Cancellation Activity |
| | NNN.NN Format |
| Order Id | Order Number |
| Response | 1 = Transaction Accepted |
| | 2 = Transaction Declined |
| | 3 = Error in transaction data or system error |

-continued

| Field Name | Description |
| --- | --- |
| Response Text | Possible values:<br>CDRN<br>CDRN_WITH_REFUND<br>CDRN_WITH_PARTIAL_REFUND<br>MERCHANT<br>RETRIEVAL<br>RETRIEVAL_WITH_REFUND |
| AVS Response | AVS Response Code |
| CVV Response | CVV Response Code |
| Authorization Code | Transaction authorization code |
| RESERVED | RESERVED |
| Merchant Name | Merchant Name |
| Merchant Account Name | Merchant Account Name |
| Order Description | Order Description |
| PO Number | Purchase Order Number |
| Shipping Amount | USD Shipping Amount<br>NNN.NN Format |
| Tax Amount | USD Tax Amount<br>NNN.NN Format |
| Billing First Name | Cardholder Billing First Name |
| Billing Last Name | Cardholder Billing Last Name |
| Billing Company | Cardholder Billing Company |
| Billing Email | Cardholder Email Address |
| Billing Phone | Cardholder Phone Number |
| Billing Fax | Cardholder Fax Number |
| Billing Website URL | Cardholder Company Website |
| Billing Address 1 | Cardholder Billing Address 1 |
| Billing Address 2 | Cardholder Billing Address 2 |
| Billing City | Cardholder Billing City |
| Billing State | Cardholder Billing State |
| Billing Postal Code | Cardholder Billing Postal Code |
| Billing Country Code | ISO-3166 Country Code<br>United States = "US" |
| Shipping First Name | Shipping First Name |
| Shipping Last Name | Shipping Last Name |
| Shipping Company | Shipping Company Name |
| Shipping Email | Shipping Email Address |
| Shipping Address 1 | Shipping Address 1 |
| Shipping Address 2 | Shipping Address 2 |
| Shipping City | Shipping City |
| Shipping State | Shipping State |
| Shipping Postal Code | Shipping Postal Code |
| Shipping Country Code | ISO-3166 Country Code<br>United States = "US" |
| IP Address | Transaction Authorization Code |
| Merchant Account ID | Reserved for Future Use |
| Authentication Value | Checking Account Name |
| CAVV | Check Routing Number |
| XID | Check Account Number |
| Shipping Carrier | Shipping Carrier - "Other", "FedEx", UPS, "USPS" |
| Tracking Number | Shipping Tracking Number |
| Shipping Date | Shipping Date |
| Cell Phone Number | Consumer Cell Phone Number |
| Billing Descriptor Name | Soft Billing Descriptor Name. Only supported by certain payment processors. |
| Billing Descriptor Phone Number | Soft Billing Descriptor Phone Number. Only supported by certain payment processors. |
| Merchant Defined Fields | Merchant Defined Data |
| Original Transaction Date | Timestamp of Referenced Transaction<br>Format: YYYYMMDDHHMMSSS |

At step 90 the dispute is confirmed to have been resolved and an acknowledgement of receipt of files by the card issuer may be transmitted to the dispute resolution system to confirm the resolution by the card issuer.

Thus, the present invention provides a system for resolving disputes between a customer and an electronic payment provider concerning an electronic transaction between the customer and a merchant, including a computer programmed to receive data related to the transaction and to transmit the data to a dispute resolution server, and a dispute resolution server programmed to compare the transaction data to predetermined eligibility criteria for dispute resolution, and if the dispute resolution criteria is met, to decline future transactions from the merchant for the disputing consumer, the server further programmed to compare the transaction data to predetermined eligibility criteria for transaction credit, and if the credit criteria is met, transmitting a credit instruction for the transaction.

The present invention also provides a computer-based method for resolving disputes between a customer and an electronic payment provider concerning an electronic transaction between the customer and a merchant, including receiving data related to the transaction in a computer; transmitting the data from the computer to a dispute resolution server; comparing the transaction data to predetermined eligibility criteria for dispute resolution in the dispute resolution server, and if the dispute resolution criteria is met, declining future transactions from the merchant for the disputing consumer; and, comparing the transaction data to predetermined eligibility criteria for transaction credit, and if the credit criteria is met, and transmitting a credit instruction for the transaction.

In accordance with one or more aspects of the embodiments described herein, there are provided techniques for integrating the dispute resolution network with partner/aggregator technology platforms to allow merchants to participate the dispute resolution process. For example, the merchant(s) or the merchant service provider's system(s) may be responsible for refunding a disputed transaction and/or declining future transactions from the merchant(s) for the disputing customer(s), thereby shifting such responsibility away from the dispute resolution server 10 or the like.

Figure 4:
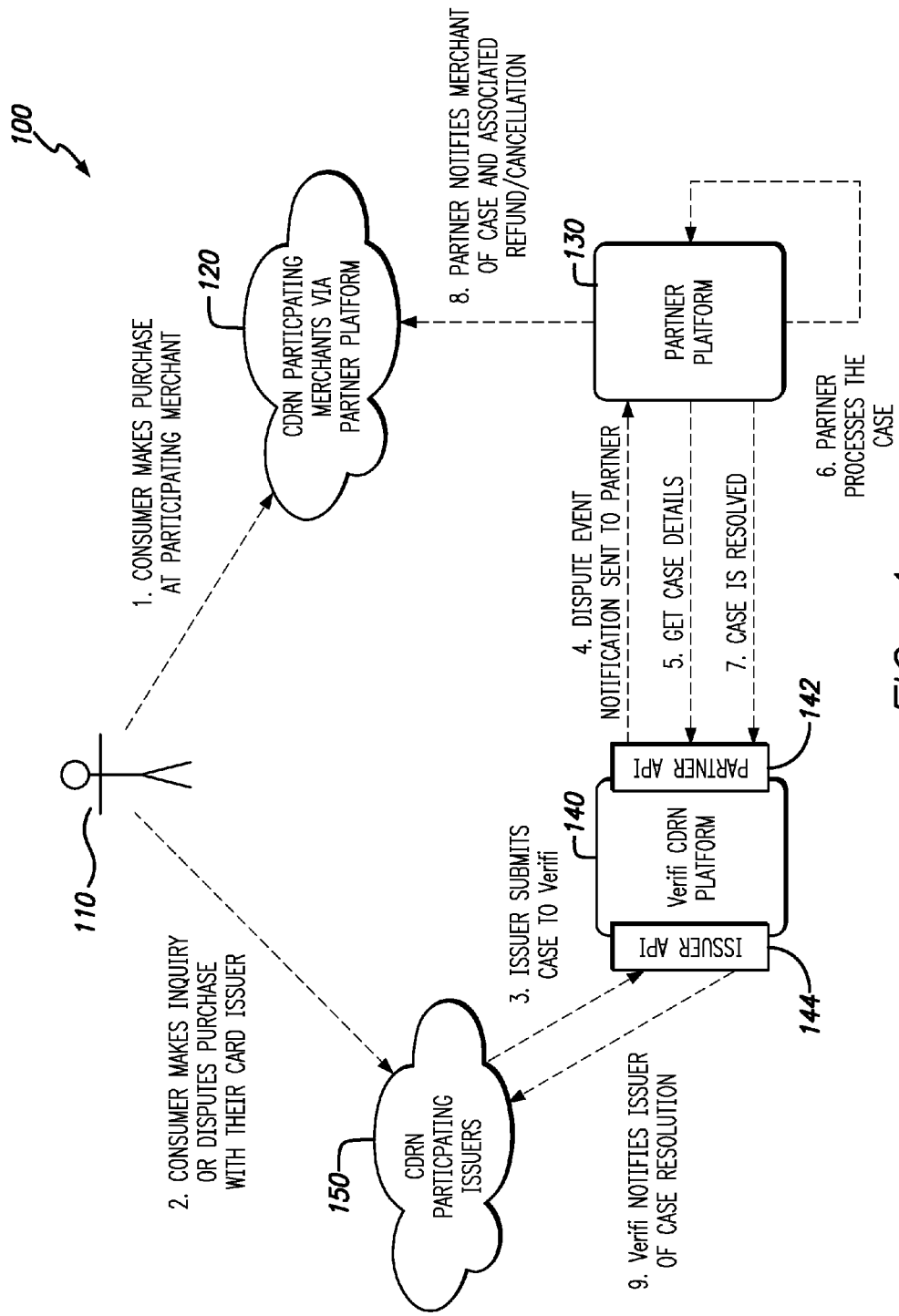
FIG. 4 illustrates an example approach to integrating a dispute resolution API with a partner.

With reference to FIG. 4, there is shown an example dispute resolution system 100 that includes numerous network entities, including merchant entities 120, partner entities 130, dispute resolution entities 140, issuer entities 150. The participating merchant(s) 120 may participate in the dispute resolution process via a dispute resolution partner platform 130. The partner platform 130 may be in operative communication with one or more merchant(s) 120, and may be an electronic commerce (e-commerce) platform with separate retail or merchant websites. The partner platform 130 may be in operative communication with a dispute resolution server or platform 140, which in turn may in communication with one or more participating card issuers 150. It is noted that the dispute resolution platform 140 may interface with the partner platform 130 via a partner API 142, and/or may interface with the participating card issuer(s) 150 via the issuer API 144. The partner API 142 may follow a RESTful API implementation, wherein the partner API 142 may enable synchronous and asynchronous processing of requests leveraging the HTTP Status Codes to indicate how the system is handling the request.

For example, a user or consumer 110 may make a purchase at a participating merchant 120. The consumer 110 may make an inquiry regarding the purchase and/or dispute the purchase/transaction with the card issuer 150. The card issuer 150 may submit the case regarding the inquiry and/or dispute to the dispute resolution platform 140, which in turn may submit a dispute event notification to the partner platform 130. The partner platform 130 may obtain case details from the dispute resolution platform 140 and/or another platform in operative communication with the dispute resolution platform 140. The partner platform 130 may processes the case, and notify the dispute resolution platform 140 that the case has been resolved. The partner platform 130 may notify the merchant 120 regarding the case and any associated refund and/or cancellation of charges. The dispute resolution platform 140 may notify the card issuer 150 of the case resolution.

In related aspects, the dispute resolution system 100 may leverage a notification scheme to notify partner(s) 120 of case events. Events may signify the creation of an inquiry or dispute case for an associated merchant 120 that is registered with the partner platform 130 and participates in the system 100. The notification scheme may allow the partner 130 to handle the case request and resolve the dispute within their platform.

In further related aspects, after the notification is sent and accepted by the partner 130, calls to the dispute resolution API may be initiated by the partner 130 to obtain additional case details, process the case resolution, and update the network with the transaction details after the case has been resolved.

Event Types:

In one embodiment, the event types may originate from the dispute resolution platform 140. The requests may be processed by a partner 130 based at least in part on the event type in accordance with the dispute resolution program running on one or more network entities of the dispute resolution system 100. Examples event types may include: Dispute; Cancel; or Revoke.

A DISPUTE event identifies a Cardholder Dispute received for the indicated merchant. Resolution of the request may involve having the referenced transaction to be refunded, and any subsequent billings for that cardholder for that product to be blocked or suspended. Typically this involves having the Account number added to a negative list managed by the partner 130 or the merchant 120.

A CANCEL event notification may involve any subsequent billing for the noted account number to be blocked or suspended. Typically this involves having the Account number added to a negative list managed by the partner 130 and/or the merchant 120.

The REVOKE event notification may be in reference to a case previously submitted by the dispute resolution platform 140 to the partner 130 for processing. In certain scenarios, a case may have been processed in error and this event type enables the case to be revoked from DISPUTE or CANCEL processing. The partner 130 may receive these notifications when a case is in the status of PROCESSING, but has not yet been RESOLVED or DECLINED.

Figure 5:
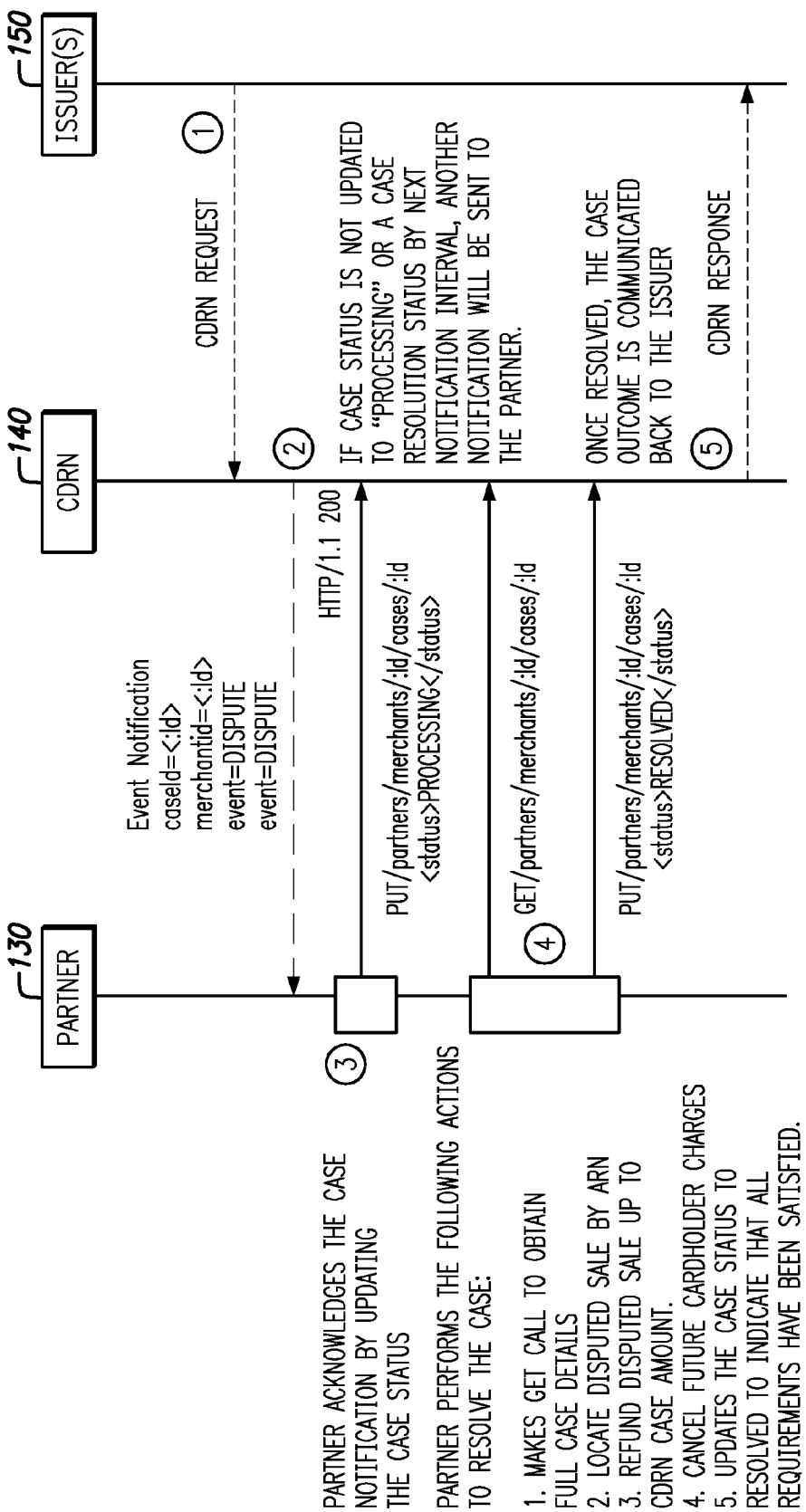
FIG. 5 provides an example call flow diagram for event notification and dispute/inquiry handling.

Event Notification:

With reference to the call flow diagram 200 of FIG. 5, the merchant 120 (not shown) or partner 130 may implement a Notification URL endpoint that will be available to receive event notifications from the dispute resolution platform 140. The notification may identify an inquiry/dispute case that is ready for processing.

It is expected that the partner 130 will acknowledge the DISPUTE and CANCEL notifications by initiating a Case Update request to set the status to PROCESSING. REVOKE notifications may be acknowledged by setting the case status to CANCELLED.

If an event is not acknowledged, and remains in the pending status following a notification, the notification may be re-submitted. The notification may be re-attempted until an acknowledgement, identified by the case status, changes from PENDING or is RESOLVED by the partner 130.

With continued reference to FIG. 5, the card issuer 150 may send a dispute resolution request to the dispute resolution platform 140, which in turn may send an event notification to the partner platform 130. The event notification may include one more of the following information: (a) case ID (e.g., a unique identifier the case across the dispute resolution platform 140 or the dispute resolution system 100 generally); (b) merchant ID (e.g., a merchant identifier that represents the Merchant Account the dispute is requested against); (c) event type (e.g., DISPUTE, CANCEL, or REVOKE); (d) notification ID (e.g., reference to the specific notification message); or variations thereof.

The partner 130 may acknowledge the Case Notification by updating the Case Status to PROCESSING, and sending such information back to the dispute resolution platform 140. At the dispute resolution platform 140, if the Case Status is not updated to PROCESSING or to a case resolution status by the next Notification Interval, then another notification may be sent to the partner 130.

For example, the partner platform may perform one or more of the following: (a) make a GET call to obtain the full case details from the dispute resolution platform 140; (b) locate the disputed sale by a global unique transaction identifier, such as, for example, an ARN or the like; (c) refund the disputed sale up to a the dispute resolution case amount if the already refunded; (d) cancel future cardholder charges for associated recurring charges; (e) update the case status to Resolved to indicate that the requirements have been satisfied. Once the case is Resolved, the Case outcome may be communicated to the issuer 150 via a dispute resolution response message or the like. With respect to (b), in one example, the referenced sale may be located by an ARN or the like. In another example, the transaction and case data attributes may be used to search for the referenced sale, wherein such data points may include the BIN, last four digits of the account number, date of the transaction, transaction amount, etc.

With respect to handling a DISPUTE event, the event notification may instruct the partner 130 to refund the disputed transaction by the amount indicated on the dispute resolution request; or if a refund has already been applied to the disputed transaction, resolve the case by providing the details of the refund fully or partially (which may optionally involve an additional partial refund to be processed). In further related aspects, the event notification may instruct the partner 130 to cancel any recurring billing for that account holder for the product/service being disputed.

With respect to handling a CANCEL event, the event notification may instruct the partner 130 to cancel any recurring or future billing for that account holder related to the product transaction referenced by the case.

With respect to handling a REVOKE event, the event notification may allow the partner 130 to stop any current processing related to the handling of the DISPUTE or CANCEL case. For example, the event notification may instruct the partner 130 to suspend any transactions related to the refunding of the original transaction or cancellation of recurring billing for the account number.

Cases:

With reference once again to FIG. 4, the dispute resolution cases may represent the dispute created by the consumer when the card issuer 150 was contacted. The dispute may be received by the dispute network or system 100, and may be pending resolution by the partner 130. The partner 130 may be able to use the HTTP methods to retrieve and resolve the case. Example HTTP methods may include GET (i.e., access and read the details of a single case by referencing the case ID or the like); PUT (i.e., update the case status and associated transaction data that may be maintained by the partner 130 or another network entity of the system 100); and/or combinations/variations thereof.

Figure 6:
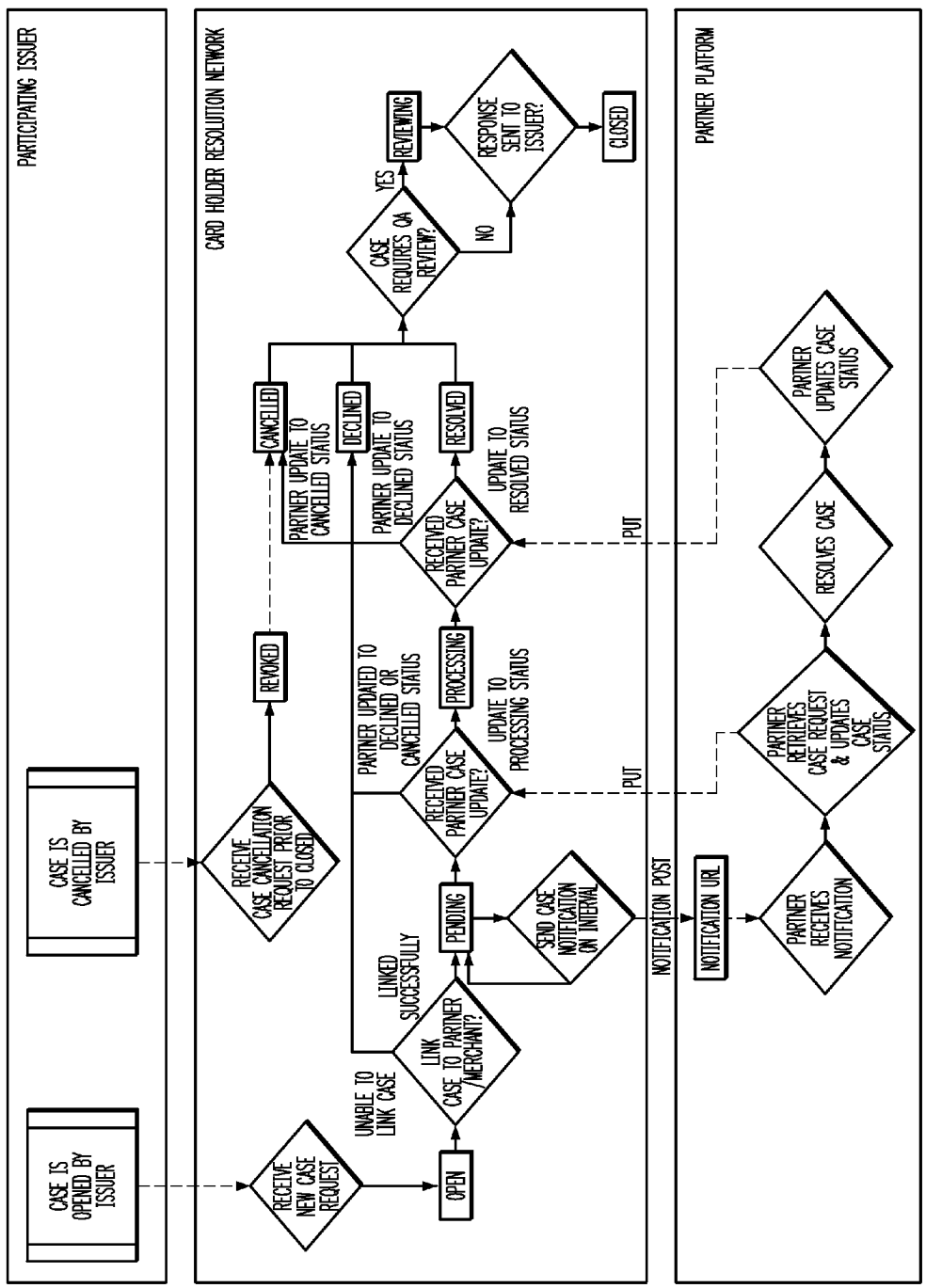
FIG. 6 shows an example case status life cycle.

With respect to the case status life cycle, the cases may flow through a status life cycle as they are handled and processed by the partner 130 and by the dispute resolution platform 140. FIG. 6 provides illustrates an example case status life cycle.

Once a case notification is sent to a partner 130 for processing, the partner 130 may be expected to resolve the case; however, a case can be revoked by the issuer 150 prior to being resolved. When this occurs a REVOKE notification may be sent to the partner 130, changing the case status to REVOKED. Both the DISPUTE and CANCEL case types can be involved in a REVOKE notification. Illustrative example scenarios and the corresponding responses are provided in the table below:

| Scenario | Expected Response |
| --- | --- |
| Partner receives notification of a case. The case may be matched to a payment transaction in the partner network. | Acknowledge the case by updating the case status to PROCESSING. Obtain the case details, and resolve the case. Update the case with details related to the resolution and update the case status to RESOLVED. |
| Partner receives notification of a case. The case is NOT able to be matched to a payment transaction in the partner network. | Acknowledge the case by updating the case status to PROCESSING. Obtain the case details, and attempt to locate the payment transaction. Assume No match could be located. Update the case with details related to the resolution and update the case status to DECLINED. |
| Partner is processing a case and receives a REVOKED notification from the dispute resolution platform. | Stop any case resolution procedures, including voiding any pending refund settlements. Update the Case status to CANCELLED. |

Communication between the dispute resolution platform 140 and the partner platform 130 may be achieved by implementing numerous configuration details (e.g., at the partner API 142 of the dispute resolution platform 140 and/or the partner platform 130). Illustrative example configuration parameters are provided in the table below:

| Parameter | Description |
| --- | --- |
| Partner ID | Assigned identifier for the partner. Represents the partner within the dispute resolution system. |
| Notification URL | The partner provides the dispute resolution platform with a publicly available Notification URL which supports the technical integration requirements of handling Notification Requests. |
| Security Key | The partner and the dispute resolution platform may leverage a shared secret key for securing the transaction requests, thereby ensuring the integrity of the message is maintained and not manipulated between sender and receiver. |
| Requires ARN | Setting to specify whether the partner requires the ARN to locate and resolve cases. (True, False) |
| Signature Hash Algorithm | The supported signature hash algorithm. |
| Max Attempts | Maximum number of Attempts the dispute resolution system will make to submit an event notification to the partner |
| Attempt Interval | Number of seconds the dispute resolution system will wait between attempts to process a request with the partner. e.g., Default = 600, Min = 15, Max = 86400 |
| Status | Status of the partner notification interface. To support system maintenance and other scheduled network downtime, the dispute resolution system may allow the partner interface to be disabled. [Active, Disabled] |

In view of exemplary systems shown and described herein, methodologies that may be implemented in accordance with the disclosed subject matter, will be better appreciated with reference to various flow charts. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 7:
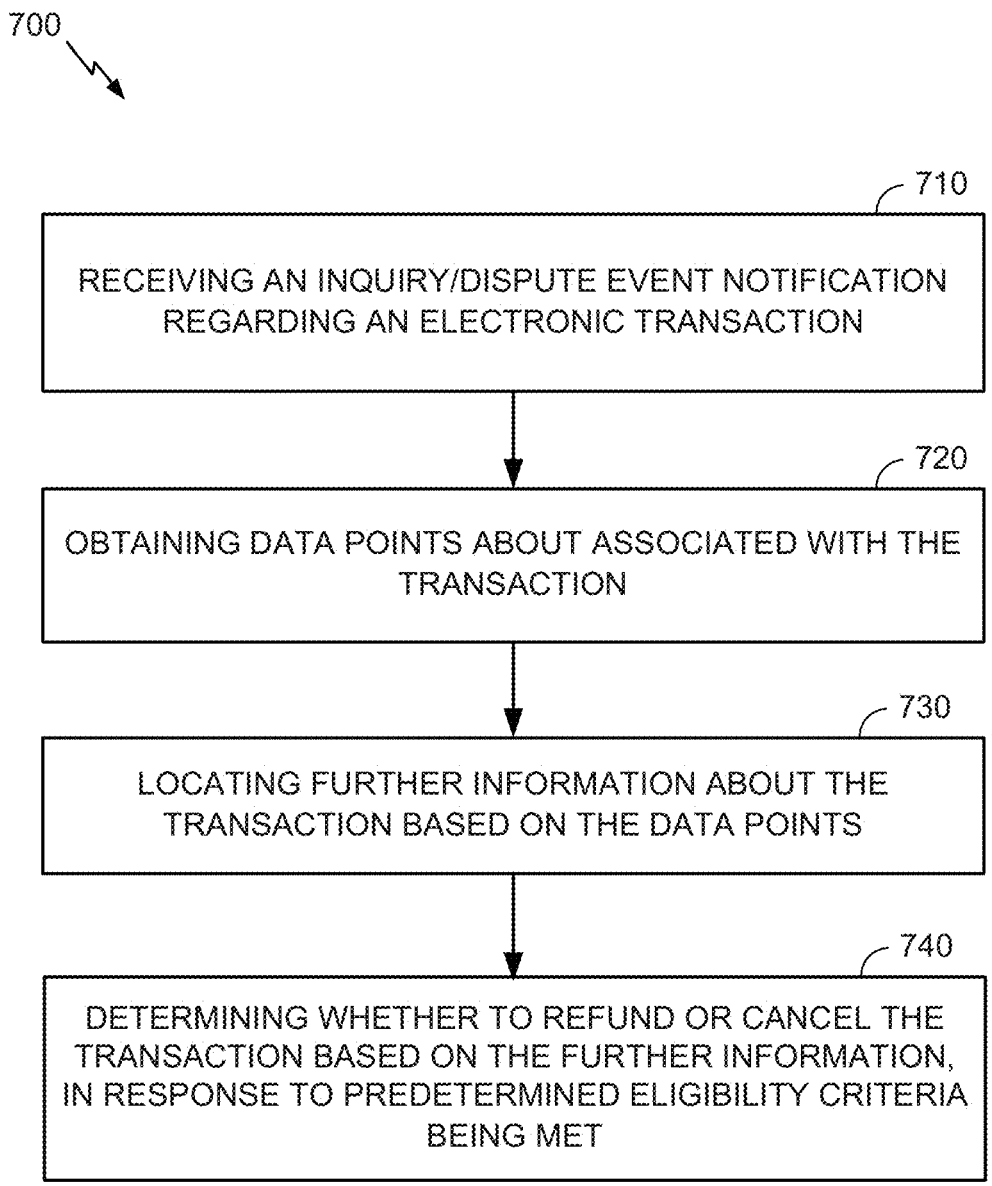
FIG. 7 illustrates an example dispute resolution methodology performed at a partner entity.

In accordance with one or more aspects of the embodiments described herein, there is provided a technique operable by at least one network entity (e.g., at least one merchant platform/server and/or at least one partner/aggregator platform/server that is in operative communication with a plurality of merchant platforms/servers) for resolving inquiries and/or disputes regarding an electronic transaction. For example, the network entity may be the partner/aggregator platform 130 and/or the merchant platform 120 shown in FIGS. 4-5, or variations thereof, or component(s) thereof. With reference to the example of FIG. 7, there is shown a methodology 700 that may involve receiving, at a merchant entity and/or a partner/aggregator entity (e.g., a partner platform or server in operative communication with one or more merchant entities), an inquiry/dispute event notification relating to a transaction (e.g., an online sale) (block 710). The method 700 may involve obtaining data points about the transaction (block 720). The method 700 may involve locating further information (locally and/or remotely) about the transaction based on the data points (block 730). The method 700 may involve determining whether to refund or cancel the transaction based on the further information, in response to predetermined eligibility criteria being met (block 740).

Figure 8:
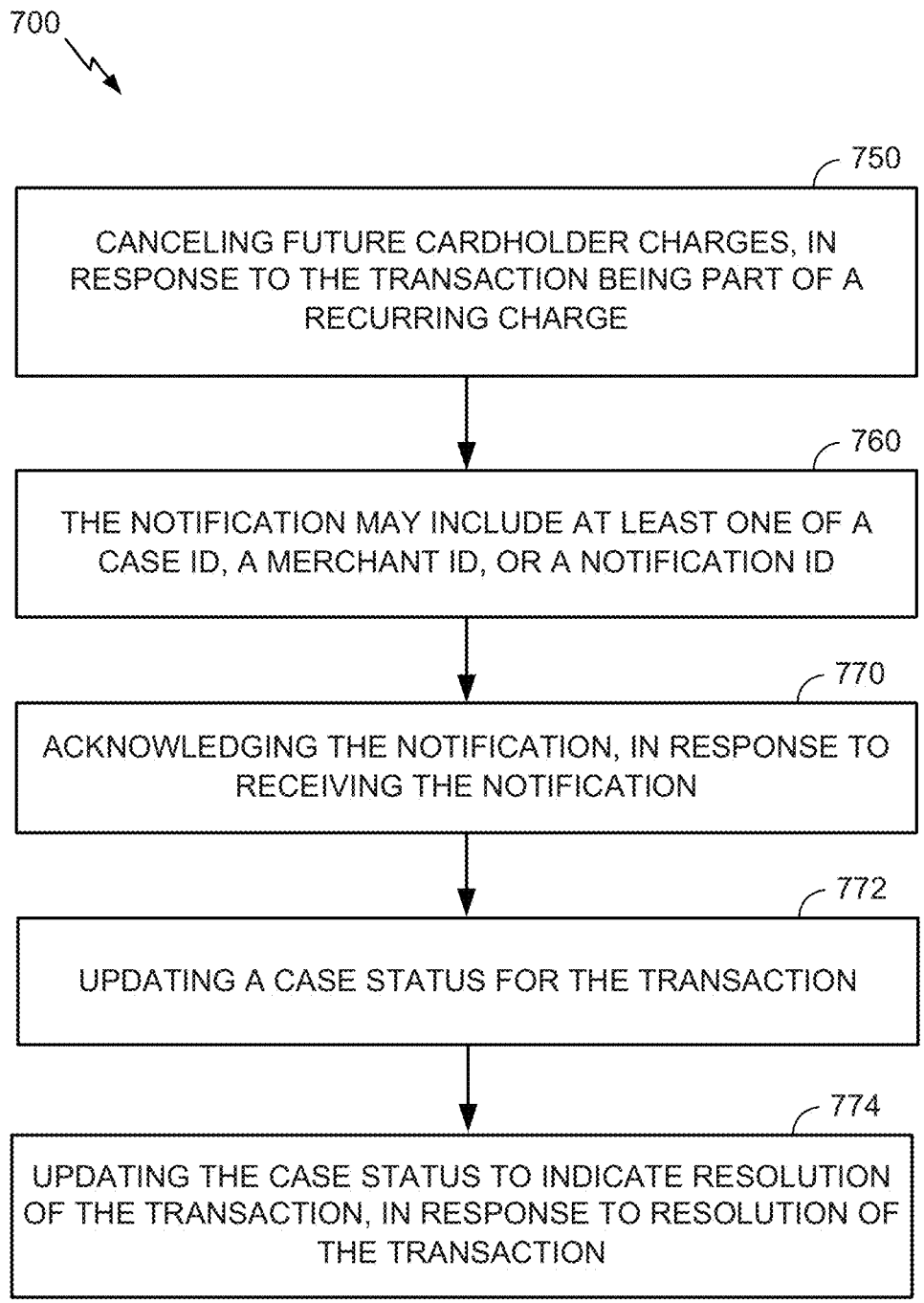
FIGS. 8-9 shows further optional aspects of the methodology of FIG. 7.

With reference to FIG. 8, in related aspects, the method 700 may further involve cancelling future cardholder charges, in response to the transaction being part of a recurring charge (block 750). In further related aspects, the notification may include at least one of a case ID, a merchant ID, or a notification ID (block 760). In yet further related aspects, the method 700 may further involve acknowledging the notification, in response to receiving the notification (block 770). Acknowledging may involve updating a case status for the transaction (block 772). The method 700 may further involve updating the case status to indicate resolution of the transaction, in response to resolution of the transaction (block 774).

Figure 9:
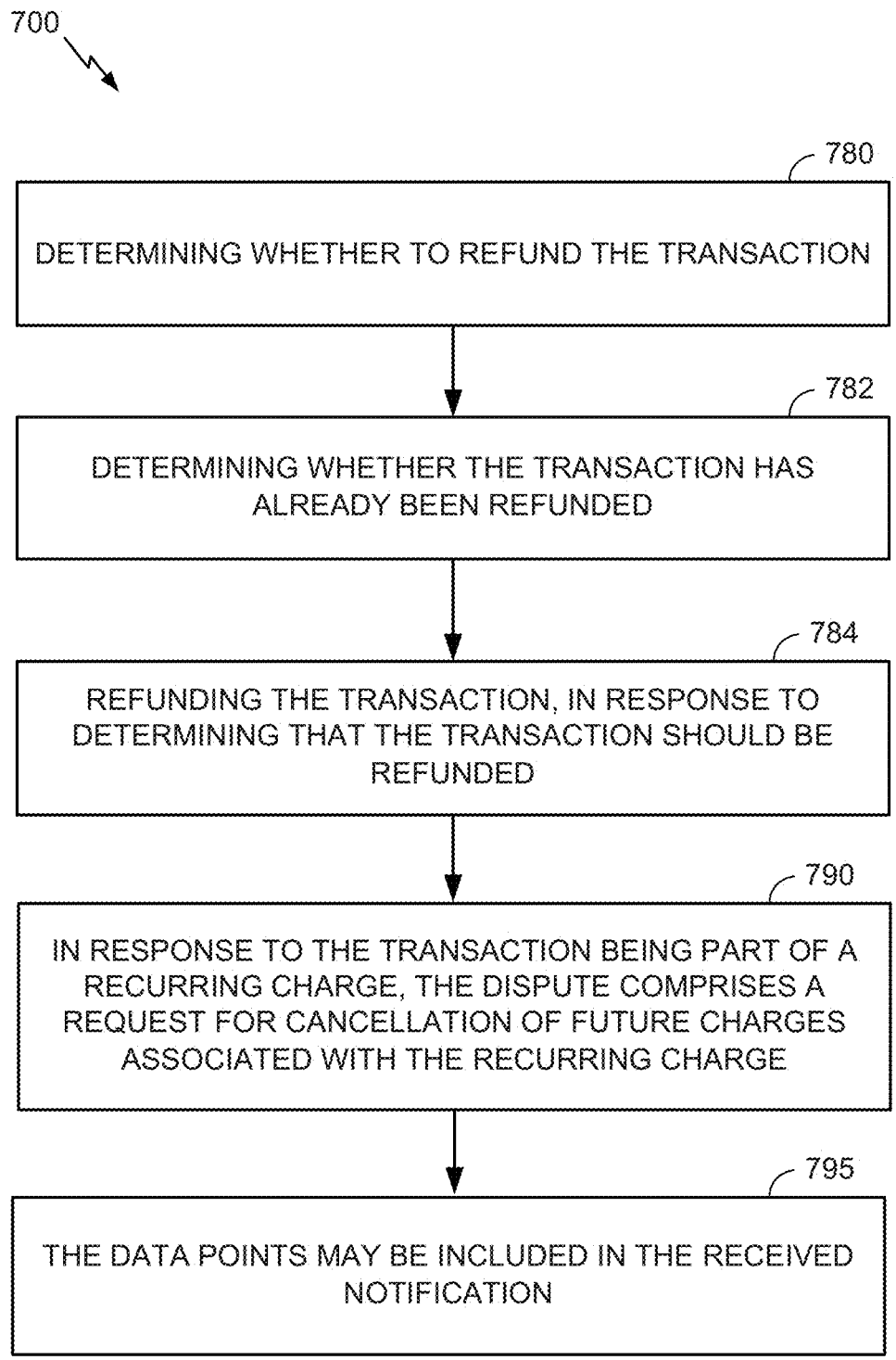

With reference to FIG. 9, in related aspects, block 740 may involve determining whether to refund the transaction (block 780). Block 780 may involve determining whether the transaction has already been refunded (block 782) and refunding the transaction, in response to determining that the transaction should be refunded (block 784). In further related aspects, the method 700 may further involve, in response to the transaction being part of a recurring charge, the dispute comprises a request for cancellation of future charges associated with the recurring charge (block 790). In yet further related aspects, the data points may be included in the received notification (block 795).

Figure 10:
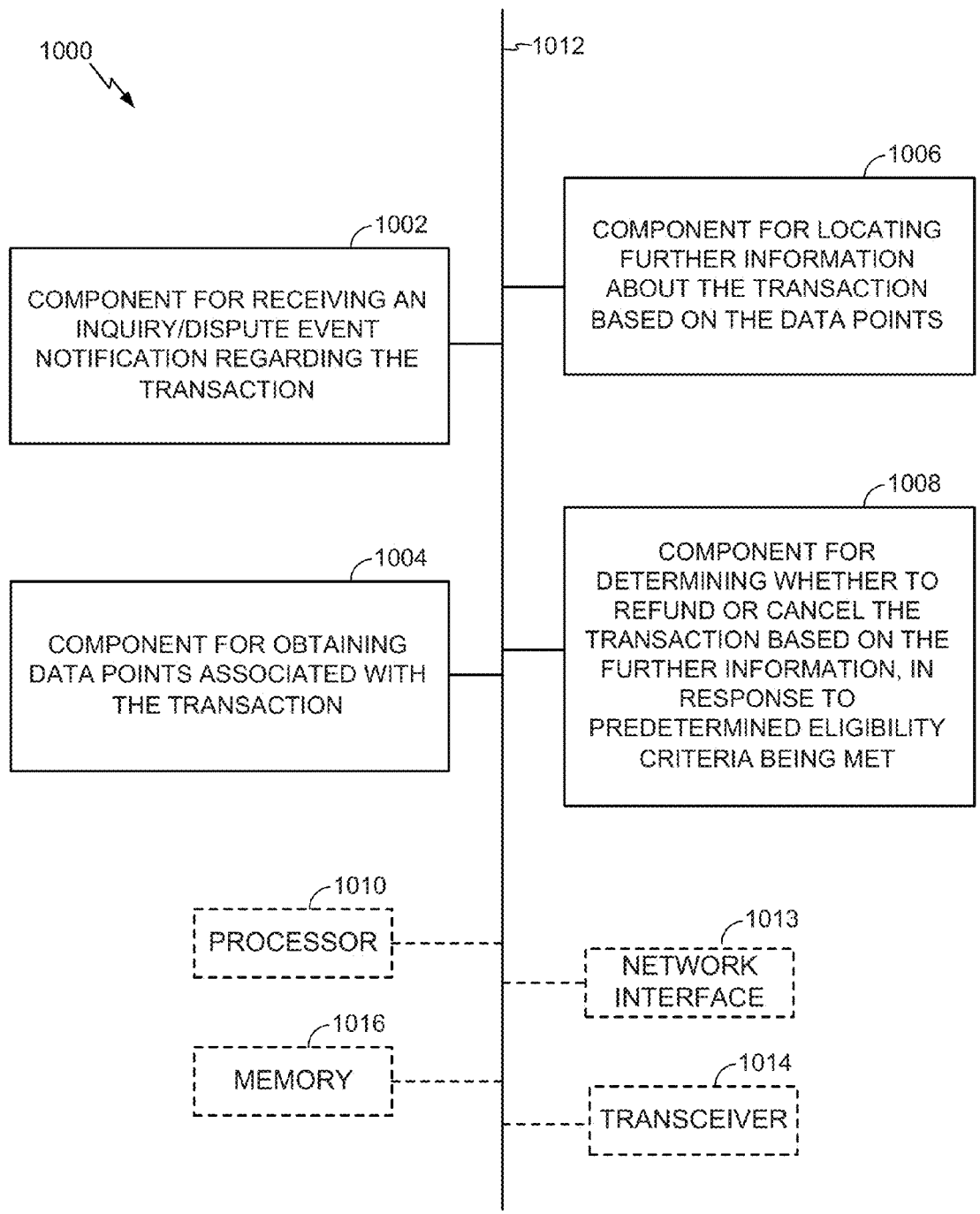
FIG. 10 shows an example apparatus for dispute resolution participation by a partner platform, in accordance with the methodology of FIGS. 7-9.

In accordance with one or more aspects of the embodiments described herein, there are provided devices and apparatuses for managing online service accounts, as described above with reference to FIGS. 7-9. With reference to FIG. 10, there is provided an exemplary apparatus 1000 that may be configured as a partner/aggregator platform or server in an online or mobile network, or as a processor or similar device for use within the partner platform or server, and/or as a merchant platform or server in an online or mobile network, or as a processor or similar device for use within the merchant platform or server. The apparatus 1000 may include functional blocks that can represent functions implemented by a processor, software, or combination thereof (e.g., firmware).

As illustrated, in one embodiment, the apparatus 1000 may include an electrical component or module 1002 for receiving an inquiry/dispute event notification regarding the transaction. The apparatus may include a component 1004 for obtaining data points about the transaction, in response to receiving the notification. The apparatus may include a component 1006 for locating the transaction based on the data points. The apparatus may include a component 1008 for determining whether to refund or cancel the transaction, in response to predetermined eligibility criteria and/or dispute resolution criteria being met.

In related aspects, the apparatus 1000 may optionally include a processor component 1010 having at least one processor, in the case of the apparatus 1000 configured as a partner entity, rather than as a processor. The processor 1010, in such case, may be in operative communication with the components 1002-1008 via a bus 1012 or similar communication coupling. The processor 1010 may effect initiation and scheduling of the processes or functions performed by electrical components 1002-1008.

In further related aspects, the apparatus 1000 may include a network interface 1013 and/or a transceiver component 1014. A stand-alone receiver and/or stand-alone transmitter may be used in lieu of or in conjunction with the transceiver 1014. The apparatus 1000 may optionally include a component for storing information, such as, for example, a memory device/component 1016. The computer readable medium or the memory component 1016 may be operatively coupled to the other components of the apparatus 1000 via the bus 1012 or the like. The memory component 1016 may be adapted to store computer readable instructions and data for effecting the processes and behavior of the components 1002-1008, and subcomponents thereof, or the processor 1010, or the methods disclosed herein. The memory component 1016 may retain instructions for executing functions associated with the components 1002-1008. While shown as being external to the memory 1016, it is to be understood that the components 1002-1008 can exist within the memory 1016.

The following claims are thus to be understood to include what is specifically illustrated and described above, what is conceptually equivalent, what can be obviously substituted and also what essentially incorporates the essential idea of the invention. Those skilled in the art will appreciate that various adaptations and modifications of the just-described preferred embodiment can be configured without departing from the scope of the invention. The illustrated embodiment has been set forth only for the purposes of example and that should not be taken as limiting the invention. Therefore, it is to be understood that, within the scope of the appended claims, the invention may be practiced other than as specifically described herein.

What is claimed is:

1. A method operable by a network entity for resolving an inquiry or dispute regarding an electronic transaction, comprising:
    receiving, at the network entity, an inquiry/dispute event notification regarding the transaction;
    obtaining, locally from the network entity or from a remotely-located network entity, data points associated with the transaction;
    locating, at the network entity or at the remotely-located network entity, further information about the transaction based on the data points; and
    determining, at the network entity, whether to refund or cancel the transaction based at least in part on the further information, in response to predetermined eligibility criteria being met.

2. The method of claim 1, further comprising canceling, at the network entity, future cardholder charges, in response to the transaction being part of a recurring charge.

3. The method of claim 1, wherein the notification comprises at least one of a case ID, a merchant ID, or a notification ID.

4. The method of claim 1, further comprising acknowledging, at the network entity, the notification, in response to receiving the notification.

5. The method of claim 4, wherein acknowledging comprises updating, at the network entity or at the remotely-located network entity, a case status for the transaction.

6. The method of claim 5, further comprising updating, at the network entity or at the remotely-located network entity, the case status to indicate resolution of the transaction.

7. The method of claim 1, wherein determining comprises determining, at the network entity, whether to refund the transaction.

8. The method of claim 7, wherein determining whether to refund the transaction comprises determining, at the network entity, whether the transaction has already been refunded.

9. The method of claim 8, further comprising refunding at the network entity, the transaction, in response to determining that the transaction should be refunded.

10. The method of claim 1, wherein the transaction comprises an online sale or an electronic payment.

11. The method of claim 1, wherein the network entity comprises a merchant entity.

12. The method of claim 1, wherein the network entity comprises a partner/aggregator entity that services multiple merchant entities.

13. The method of claim 1, wherein the dispute comprises a request for at least one of a refund or cancellation of the transaction.

14. The method of claim 1, wherein, in response to the transaction being part of a recurring charge, the dispute comprises a request for cancellation of future charges associated with the recurring charge.

15. The method of claim 1, wherein the data points are included in the notification.

16. An apparatus, comprising:
    a receiver for receiving an inquiry/dispute event notification regarding an electronic transaction;
    a memory for storing data; and
    at least one processor in operative communication with the receiver and the memory, the at least one processor configured to: obtain data points associated with the transaction; locate further information about the transaction based on the data points; and determine whether to refund or cancel the transaction based at least in part on the further information, in response to predetermined eligibility criteria being met.

17. The apparatus of claim 16, wherein the at least one processor is configured to cancel future cardholder charges, in response to the transaction being part of a recurring charge.

18. The apparatus of claim 16, wherein the apparatus comprises a merchant device or a partner/aggregator device in operative communication with multiple merchant devices.

19. The apparatus of claim 18, wherein the merchant device comprises a merchant server, and wherein the partner/aggregator device comprises a partner/aggregator server.

20. An apparatus, comprising:
   means for receiving an inquiry/dispute event notification regarding the transaction;
   means for obtaining data points associated with the transaction;
   means for locating further information about the transaction based on the data points; and
   means for determining whether to refund or cancel the transaction based at least in part on the further information, in response to predetermined eligibility criteria being met.

21. The apparatus of claim 20, further comprising means for canceling future cardholder charges, in response to the transaction being part of a recurring charge.

22. A computer program product comprising, comprising:
   a non-transitory computer readable medium comprising code for causing a computer to:
      receive an inquiry/dispute event notification regarding the transaction;
      obtain data points associated with the transaction;
      locate further information about the transaction based on the data points; and
   determine whether to refund or cancel the transaction based at least in part on the further information, in response to predetermined eligibility criteria being met.

* * * * *